(12) United States Patent
Gally et al.

(10) Patent No.: US 8,102,407 B2
(45) Date of Patent: Jan. 24, 2012

(54) METHOD AND DEVICE FOR MANIPULATING COLOR IN A DISPLAY

(75) Inventors: Brian J. Gally, Los Gatos, CA (US); William J. Cummings, Millbrae, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 870 days.

(21) Appl. No.: 11/208,167

(22) Filed: Aug. 19, 2005

(65) Prior Publication Data

US 2006/0066641 A1    Mar. 30, 2006

Related U.S. Application Data

(60) Provisional application No. 60/613,491, filed on Sep. 27, 2004, provisional application No. 60/623,072, filed on Oct. 28, 2004.

(51) Int. Cl.
*G09G 5/02*    (2006.01)
(52) U.S. Cl. ............ 345/698; 359/273; 359/337.22
(58) Field of Classification Search ............ 345/698; 359/273, 337.22
See application file for complete search history.

(56) References Cited

U.S. PATENT DOCUMENTS

| | | |
|---|---|---|
| 3,448,334 A | 6/1969 | Frost |
| 4,441,791 A | 4/1984 | Hornbeck |
| 4,878,741 A | 11/1989 | Fergason |
| 4,929,061 A | 5/1990 | Tominaga et al. |
| 5,142,414 A | 8/1992 | Koehler |
| 5,168,406 A | 12/1992 | Nelson |
| 5,327,263 A | 7/1994 | Katagiri |
| 5,345,322 A | 9/1994 | Fergason et al. |
| 5,452,024 A | 9/1995 | Sampsell |
| 5,589,852 A | 12/1996 | Thompson et al. |
| 5,619,059 A | 4/1997 | Li et al. |
| 5,638,084 A | 6/1997 | Kalt |
| 5,737,115 A | 4/1998 | Mackinlay et al. |
| 5,771,321 A * | 6/1998 | Stern ............... 385/31 |
| 5,835,255 A | 11/1998 | Miles |
| 5,853,310 A | 12/1998 | Nishimura |
| 5,914,804 A | 6/1999 | Goossen |
| 5,986,796 A | 11/1999 | Miles |
| 6,028,690 A | 2/2000 | Carter et al. |
| 6,031,653 A | 2/2000 | Wang |

(Continued)

FOREIGN PATENT DOCUMENTS

CN    1409157    4/2003

(Continued)

OTHER PUBLICATIONS

PCT Search Report and Written Opinion for Co-Pending PCT application No. PCT/US2005/032426, dated Jan. 11, 2006.

(Continued)

*Primary Examiner* — Amare Mengistu
*Assistant Examiner* — Koosha Sharifi-Tafreshi
(74) *Attorney, Agent, or Firm* — Knobbe, Martens, Olson & Bear LLP

(57) ABSTRACT

Embodiments include methods and devices for controlling the spectral profile and color gamut of light produced by an interferometric display. Such devices include illuminating a display with selected wavelengths of light. Embodiments also include a display comprising separate sections that output different predetermined colors of light. Other embodiments include methods of making the aforementioned devices.

50 Claims, 10 Drawing Sheets

U.S. PATENT DOCUMENTS

| | | | |
|---|---|---|---|
| 6,040,937 A | 3/2000 | Miles | |
| 6,055,090 A | 4/2000 | Miles | |
| 6,057,878 A | 5/2000 | Ogiwara | |
| 6,088,102 A | 7/2000 | Manhart | |
| 6,137,904 A | 10/2000 | Lubin et al. | |
| 6,147,728 A | 11/2000 | Okumura | |
| 6,195,196 B1 | 2/2001 | Kimura | |
| 6,213,615 B1 | 4/2001 | Siltari | |
| 6,229,916 B1 | 5/2001 | Ohkubo | |
| 6,301,000 B1 | 10/2001 | Johnson | |
| 6,323,834 B1 * | 11/2001 | Colgan et al. | 345/84 |
| 6,342,970 B1 | 1/2002 | Sperger | |
| 6,356,378 B1 | 3/2002 | Huibers | |
| 6,400,738 B1 | 6/2002 | Tucker | |
| 6,421,054 B1 | 7/2002 | Hill et al. | |
| 6,570,584 B1 | 5/2003 | Cok | |
| 6,597,419 B1 | 7/2003 | Okada | |
| 6,643,069 B2 | 11/2003 | Dewald | |
| 6,650,455 B2 | 11/2003 | Miles | |
| 6,657,611 B1 | 12/2003 | Sterken | |
| 6,674,562 B1 | 1/2004 | Miles | |
| 6,680,792 B2 | 1/2004 | Miles | |
| 6,747,785 B2 | 6/2004 | Chen et al. | |
| 6,760,146 B2 | 7/2004 | Ikeda et al. | |
| 6,768,555 B2 | 7/2004 | Chen | |
| 6,798,469 B2 | 9/2004 | Kimura | |
| 6,806,924 B2 | 10/2004 | Niiyama | |
| 6,822,780 B1 | 11/2004 | Long | |
| 6,825,969 B2 | 11/2004 | Chen et al. | |
| 6,862,029 B1 | 3/2005 | D'Souza et al. | |
| 6,867,896 B2 | 3/2005 | Miles | |
| 6,912,022 B2 | 6/2005 | Lin | |
| 6,930,816 B2 | 8/2005 | Mochizuki | |
| 6,982,820 B2 | 1/2006 | Tsai | |
| 6,995,890 B2 | 2/2006 | Lin et al. | |
| 7,006,272 B2 | 2/2006 | Tsai | |
| 7,016,095 B2 | 3/2006 | Lin | |
| 7,025,464 B2 | 4/2006 | Beenson et al. | |
| 7,034,981 B2 | 4/2006 | Makigaki | |
| 7,038,752 B2 | 5/2006 | Lin | |
| 7,042,643 B2 | 5/2006 | Miles | |
| 7,072,093 B2 | 7/2006 | Piehl | |
| 7,110,158 B2 | 9/2006 | Miles | |
| 7,113,339 B2 | 9/2006 | Taguchi et al. | |
| 7,123,216 B1 | 10/2006 | Miles | |
| 7,126,738 B2 | 10/2006 | Miles | |
| 7,161,728 B2 | 1/2007 | Sampsell | |
| 7,172,915 B2 | 2/2007 | Lin et al. | |
| 7,176,861 B2 | 2/2007 | Dedene et al. | |
| 7,198,973 B2 | 4/2007 | Lin et al. | |
| 7,271,790 B2 | 9/2007 | Hudson et al. | |
| 7,304,784 B2 | 12/2007 | Chui | |
| 7,317,568 B2 | 1/2008 | Gally et al. | |
| 7,483,197 B2 | 1/2009 | Miles | |
| 7,486,429 B2 | 2/2009 | Chui | |
| 7,489,428 B2 | 2/2009 | Sampsell | |
| 7,525,730 B2 | 4/2009 | Floyd | |
| 7,595,811 B2 | 9/2009 | Matsuda | |
| 7,660,028 B2 | 2/2010 | Lan | |
| 7,710,632 B2 | 5/2010 | Cummings | |
| 7,742,034 B2 | 6/2010 | Jak et al. | |
| 7,898,521 B2 | 3/2011 | Gally | |
| 7,911,428 B2 | 3/2011 | Gally | |
| 7,929,196 B2 | 4/2011 | Gally et al. | |
| 2002/0006044 A1 | 1/2002 | Harbers | |
| 2002/0024711 A1 | 2/2002 | Miles | |
| 2002/0054424 A1 | 5/2002 | Miles | |
| 2002/0154215 A1 | 10/2002 | Schechterman | |
| 2002/0191130 A1 | 12/2002 | Liang | |
| 2003/0151821 A1 | 8/2003 | Favalora | |
| 2003/0179383 A1 | 9/2003 | Chen | |
| 2003/0214621 A1 | 11/2003 | Kim | |
| 2004/0051929 A1 | 3/2004 | Sampsell | |
| 2004/0066477 A1 | 4/2004 | Morimoto | |
| 2004/0080807 A1 | 4/2004 | Chen et al. | |
| 2004/0100594 A1 | 5/2004 | Huibers | |
| 2004/0113875 A1 | 6/2004 | Miller et al. | |
| 2004/0114242 A1 | 6/2004 | Sharp | |
| 2004/0115339 A1 | 6/2004 | Ito | |
| 2004/0188599 A1 | 9/2004 | Viktorovitch | |
| 2004/0209195 A1 | 10/2004 | Lin | |
| 2004/0217919 A1 | 11/2004 | Piehl | |
| 2004/0218251 A1 | 11/2004 | Piehl et al. | |
| 2004/0233503 A1 | 11/2004 | Kimura | |
| 2004/0240032 A1 | 12/2004 | Miles | |
| 2005/0002082 A1 | 1/2005 | Miles | |
| 2005/0046919 A1 * | 3/2005 | Taguchi et al. | 359/237 |
| 2005/0069209 A1 | 3/2005 | Damera-Venkata et al. | |
| 2005/0083352 A1 | 4/2005 | Higgins | |
| 2005/0195462 A1 | 9/2005 | Lin | |
| 2006/0066541 A1 | 3/2006 | Gally | |
| 2006/0066557 A1 | 3/2006 | Floyd | |
| 2006/0066935 A1 | 3/2006 | Cummings | |
| 2006/0067651 A1 * | 3/2006 | Chui | 385/147 |
| 2006/0077124 A1 | 4/2006 | Gally | |
| 2006/0077127 A1 | 4/2006 | Sampsell | |
| 2006/0077148 A1 | 4/2006 | Gally | |
| 2006/0077149 A1 | 4/2006 | Gally | |
| 2006/0103912 A1 | 5/2006 | Katoh | |
| 2007/0031097 A1 | 2/2007 | Heikenfeld | |
| 2007/0085789 A1 | 4/2007 | De Vaan | |
| 2007/0247704 A1 | 10/2007 | Mignard | |
| 2008/0112031 A1 | 5/2008 | Gally et al. | |
| 2008/0288225 A1 | 11/2008 | Djordjev | |
| 2009/0296191 A1 | 12/2009 | Floyd | |
| 2010/0014148 A1 | 1/2010 | Djordjev | |
| 2010/0245975 A1 | 9/2010 | Cummings | |
| 2011/0043889 A1 | 2/2011 | Mignard | |
| 2011/0141163 A1 | 6/2011 | Gally et al. | |

FOREIGN PATENT DOCUMENTS

| | | |
|---|---|---|
| EP | 0 366 117 | 5/1990 |
| EP | 0 389 031 | 9/1990 |
| EP | 0 330 361 | 4/1993 |
| EP | 0 695 959 | 2/1996 |
| EP | 0 786 911 | 7/1997 |
| EP | 0 830 032 | 3/1998 |
| EP | 1 205 782 | 5/2002 |
| EP | 1 298 635 | 4/2003 |
| FR | 2 760 559 | 9/1998 |
| GB | 2 315 356 | 1/1998 |
| GB | 2 321 532 | 7/1998 |
| JP | 05 281479 | 10/1993 |
| JP | 08 018990 | 1/1996 |
| JP | 09-189910 | 7/1997 |
| JP | 09 281917 | 10/1997 |
| JP | 10 319877 | 12/1998 |
| JP | 11 211999 | 8/1999 |
| JP | 2000 500245 | 1/2000 |
| JP | 2002 062505 A | 2/2002 |
| JP | 2002-149116 | 5/2002 |
| JP | 2002-229023 | 8/2002 |
| JP | 2003-021821 A | 1/2003 |
| JP | 2003 255324 | 9/2003 |
| JP | 2003 255379 | 9/2003 |
| JP | 2003 295160 | 10/2003 |
| JP | 2003-315732 | 11/2003 |
| JP | 2004-117815 | 4/2004 |
| JP | 2004-212673 | 7/2004 |
| JP | 2004-212922 | 7/2004 |
| JP | 2004-534280 A | 11/2004 |
| JP | 2005-527861 | 9/2005 |
| KR | 2002 010322 | 2/2002 |
| WO | WO 95/30924 | 11/1995 |
| WO | WO 96/08833 | 3/1996 |
| WO | WO 97/17628 | 5/1997 |
| WO | WO 99/52006 A2 | 10/1999 |
| WO | WO 03/007049 | 1/2003 |
| WO | WO 03/100756 | 12/2003 |
| WO | WO 2004/068460 A | 8/2004 |
| WO | WO 2006/036524 | 4/2006 |

OTHER PUBLICATIONS

Miles, MW "A MEMS Based Interferometric Modulator (IMOD) for Display Applications" Proceedings of Sensors Expo, Oct. 21, 1997 © 1997 Helmer's Publishing, Inc., pp. 281-284 XP009058455.

"CIE Color System," available at http:hyperphysics.phy-astr.gsu.edu/hbase/vision/cie.htnnl at least until Dec. 30, 2007.

Aratani K. et al. "Surface Micromachined Tuneable Interferometer Array," Sensors and Actuators A, vol. A43, No. 1/3, pp. 17-23, May 1994.

Conner, "Hybrid Color Display Using Optical Interference Filter Array," SID Digest, pp. 577-580 (1993).

Manzardo et al., "Optics and Actuators for Miniaturized Spectrometers," International Conf. on Optical MEMS, vol. 12, Issue 6, pp. 23-24, Dec. 2003.

Mark W. Miles, "A New Reflective FPD Technology Using interfermotric modulation" Journal of the Society or Information Display vol. 5 No. 4 pp. 379-382, 1997.

Mark W. Miles, "Interferometric Modulation: A MEMS Based Technology for the Modulation of Light," Final Program and Proceedings IS&T's 50th Annual Conference, pp. 674-677, 1997.

Mark W. Miles, "MEMS-based Interferometric Modulator for Display Applications," Proceedings of SPIE Micromachined Devices and Components, pp. 20-28, 1999.

Miles, M. et al., "Digital Paper™ for reflective displays," Journal of the Society for Information Display, Society for Information Display, San Jose, US, vol. 11, No. 1, pp. 209-215, 2003.

Miles, M.W., "Interferometric Modulation MOEMS as an enabling technology for high-performance reflective displays," Proceedings of the SPIE, vol. 4985, pp. 131-139, 28, Jan. 2003.

International Preliminary Report of Patentability in PCT/US2005/032426 (International Publication No. WO 2006/036524) dated Apr. 5, 2007.

* cited by examiner

|  | Column Output Signals | |
|---|---|---|
|  | +$V_{bias}$ | -$V_{bias}$ |
| Row Output Signals   0 | Stable | Stable |
| +$\Delta V$ | Relaxed | Actuate |
| -$\Delta V$ | Actuate | Relaxed |

METHOD AND DEVICE FOR MANIPULATING COLOR IN A DISPLAY

RELATED APPLICATIONS

This application claims the benefit of, and incorporates by reference in its entirety, U.S. Provisional Application No. 60/613,491 filed Sep. 27, 2004; and U.S. Provisional Application No. 60/623,072, filed Oct. 28, 2004.

FIELD

The field of the invention relates to microelectromechanical systems (MEMS).

BACKGROUND

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Preferred Embodiments" one will understand how the features of this invention provide advantages over other display devices.

Another embodiment includes a display comprising separate sections. The display comprises a first plurality of pixels in a first section of the display configured to display a first image and a second plurality of pixels in a second section of the display configured to display a second image. The first plurality of pixels is different from the second plurality of pixels such that the first plurality of pixels output light of a different color than the second plurality of pixels.

Another embodiment includes a display. The display includes a first plurality of light modulators located in a first region of the display. Each of the light modulators comprises a reflective surface configured to be positioned at a distance from a partially reflective surface. The distance is selected so as to produce a first color. The first plurality of light modulators is configured to display a first image. The display further includes a second plurality of light modulators located in a second region of the display. Each of the light modulators comprising a reflective surface is configured to be positioned at a distance from a partially reflective surface. The distance is selected so as to produce a second color. The second plurality of light modulators is configured to display a second image. The first and second regions of the display are non-overlapping regions.

Another embodiment includes a display comprising a first means for displaying a pixel of a first image in a first section of the display and a second means for displaying a pixel of a second image in a second section of the display. The first means is different from the second means such that the first means outputs light of a different color than the second means.

Another embodiment includes a display. The display includes means for interferometrically producing of a first color in a first monochrome region of the display to display a first image and means for interferometrically producing of a second color in a first second monochrome region of the display to display a second image. The first and second monochrome regions of the display are non-overlapping regions.

Another embodiment includes a method of making a display comprising separate sections. The method includes forming a first plurality of pixels in a first section of the display. Each of the first plurality of pixels comprises at least one light modulator. The method further includes forming a second plurality of pixels in a second section of the display. The second plurality of pixels comprises at least one light modulator. The second plurality of pixels is different from the first plurality of pixels such that the first plurality of pixels output light of a different color than the second plurality of pixels.

DETAILED DESCRIPTION OF PREFERRED EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

One embodiment is a display that includes color interferometric modulators in which light received by the modulators is filtered using a color or wavelength filter to increase the color gamut of the display by increasing the saturation of light output by the modulators. Another embodiment is a display that includes color interferometric modulators that are illuminated using light having a narrow spectral content that increases the saturation of light output by the modulators so as to improve the color gamut of the display. In one such embodiment, the illumination is provided by provided by a photoluminescent material. Other embodiments include a display comprising separate regions or sections that output different predetermined colors of light.

Figure 1:
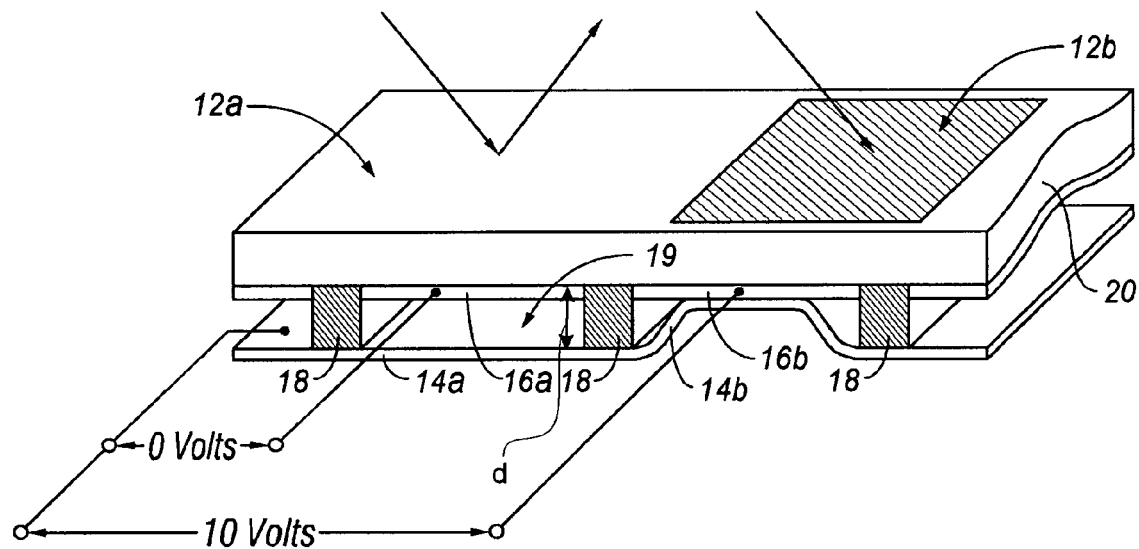
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
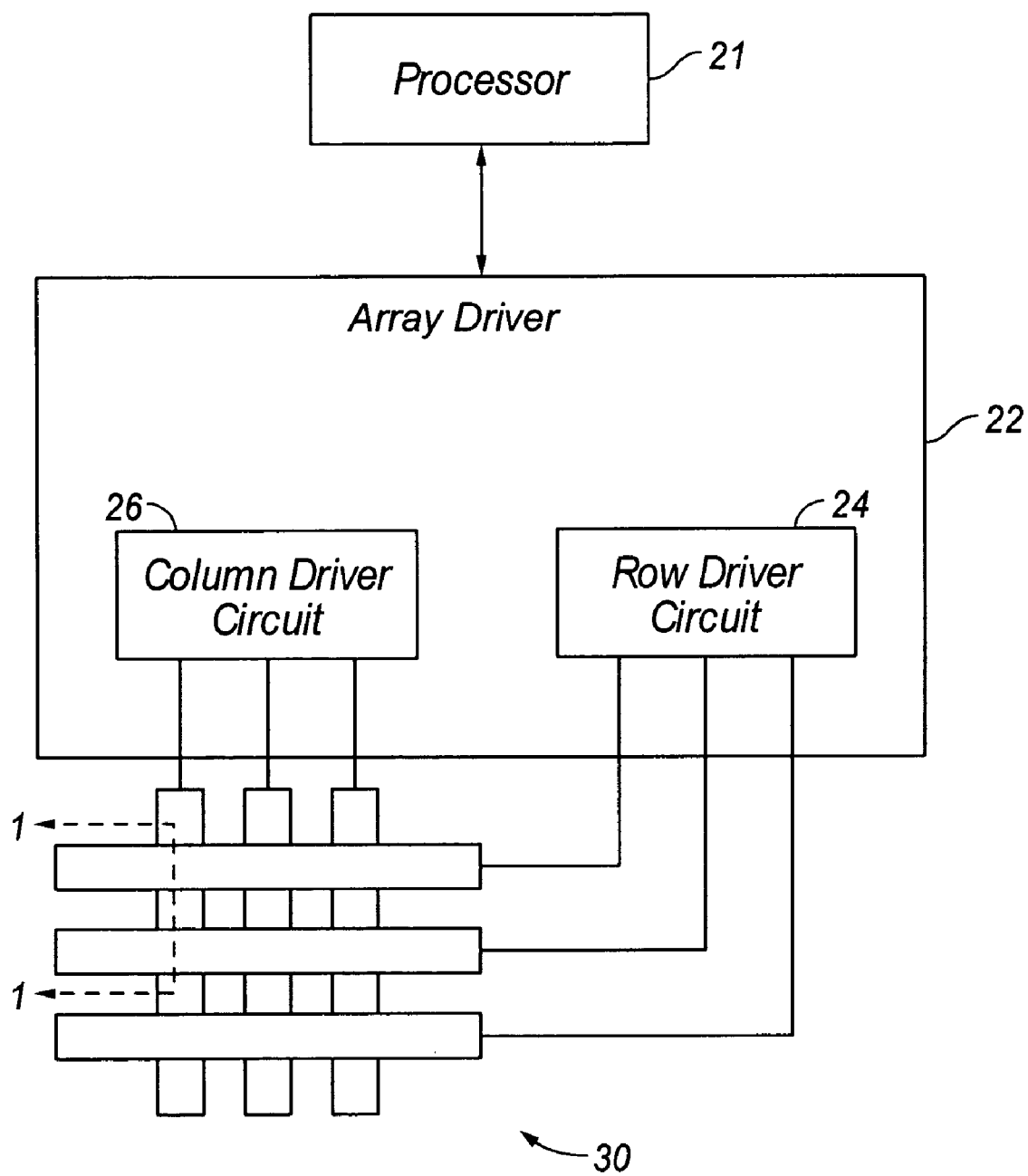
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
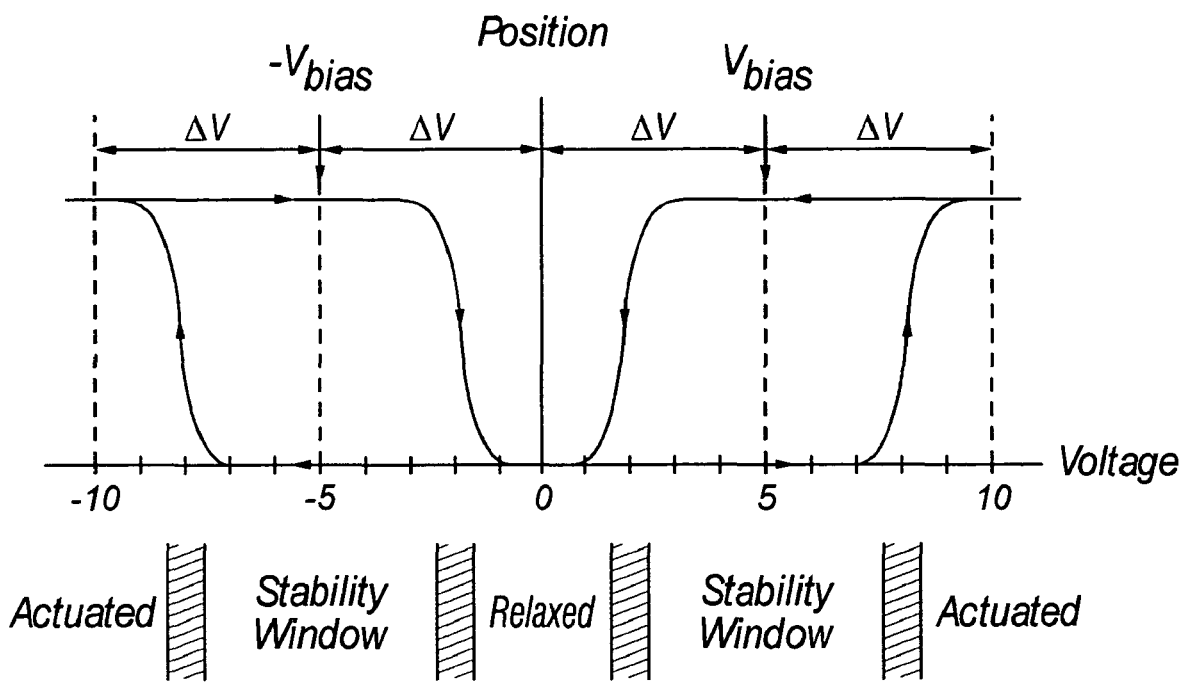
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
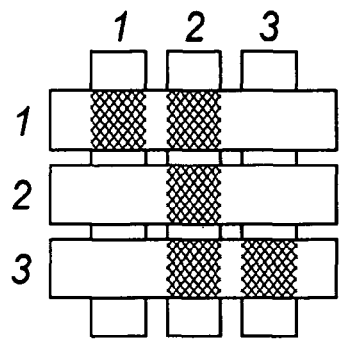
FIGS. 5A and 5B illustrate one exemplary timing diagram for row and column signals that may be used to write a frame of display data to the 3×3 interferometric modulator display of FIG. 2.
Figure 5B:
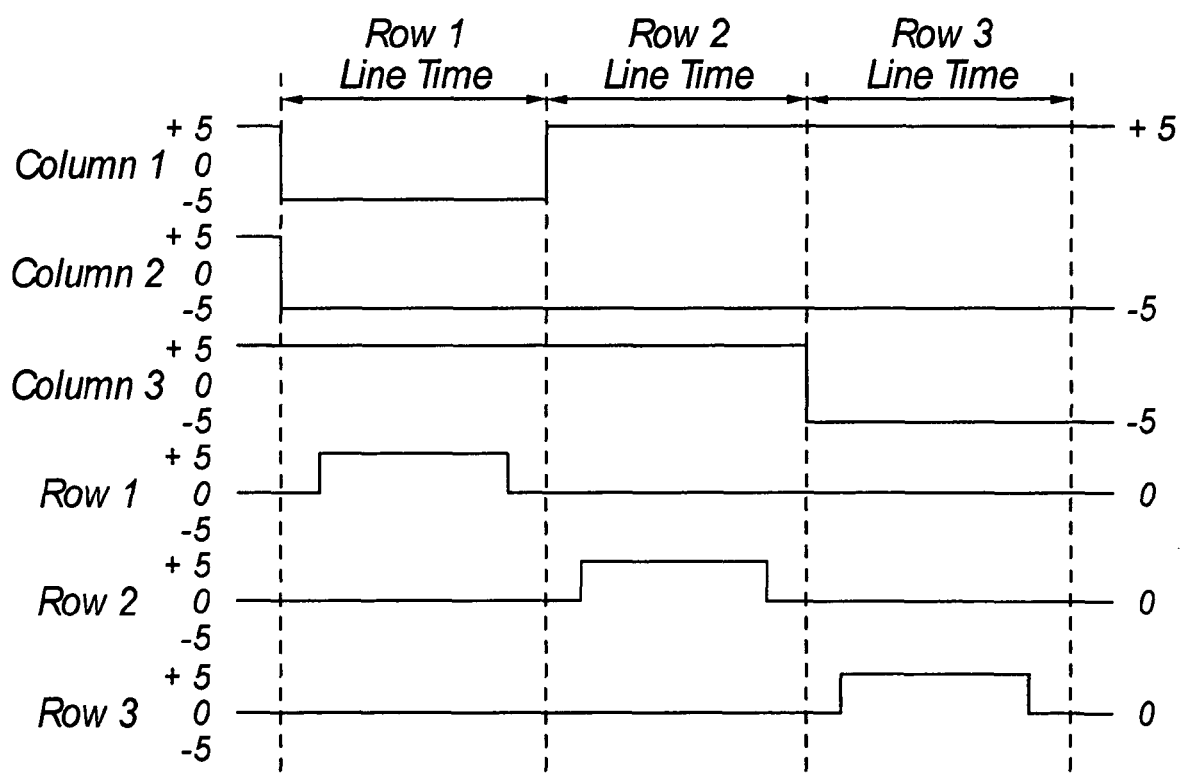

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
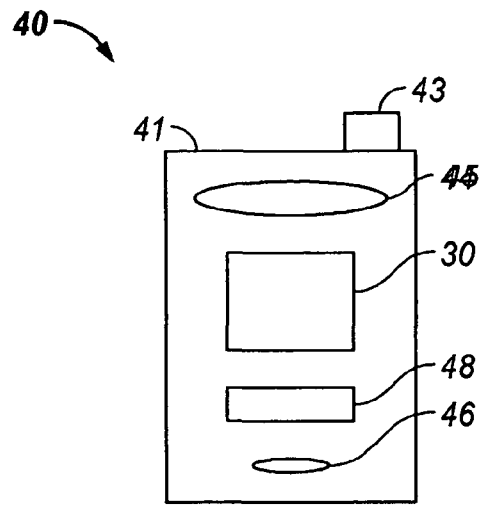
FIGS. 6A and 6B are system block diagrams illustrating an embodiment of a visual display device comprising a plurality of interferometric modulators.
Figure 6B:
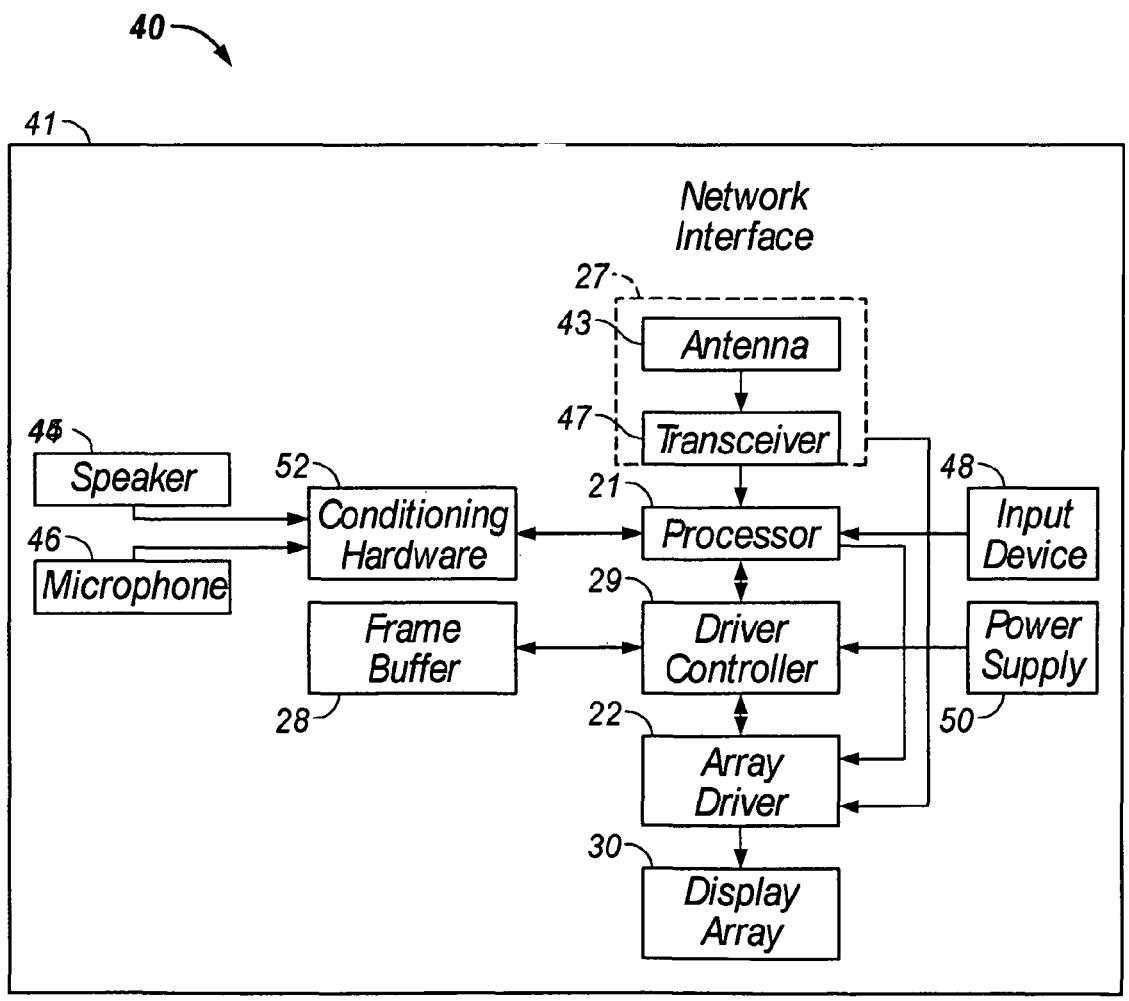

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
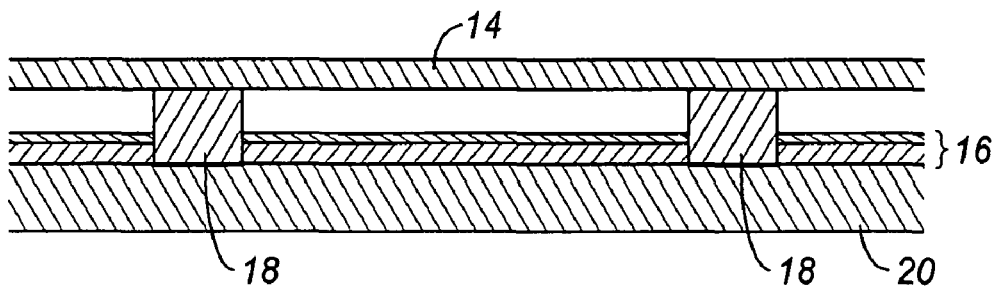
FIG. 7A is a cross section of the device of FIG. 1.
Figure 7B:
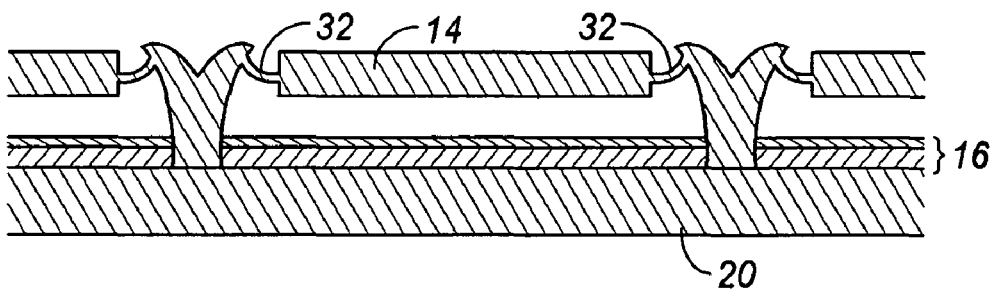
FIG. 7B is a cross section of an alternative embodiment of an interferometric modulator.
Figure 7C:
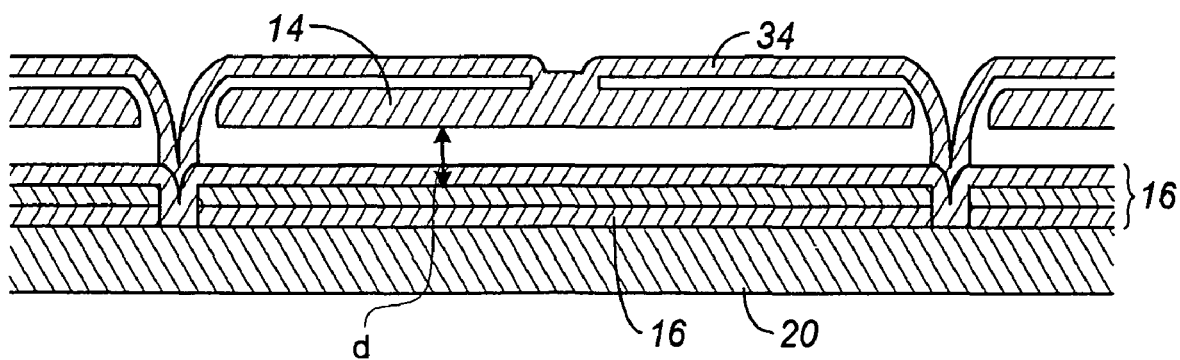
FIG. 7C is a cross section of another alternative embodiment of an interferometric modulator.
Figure 7D:
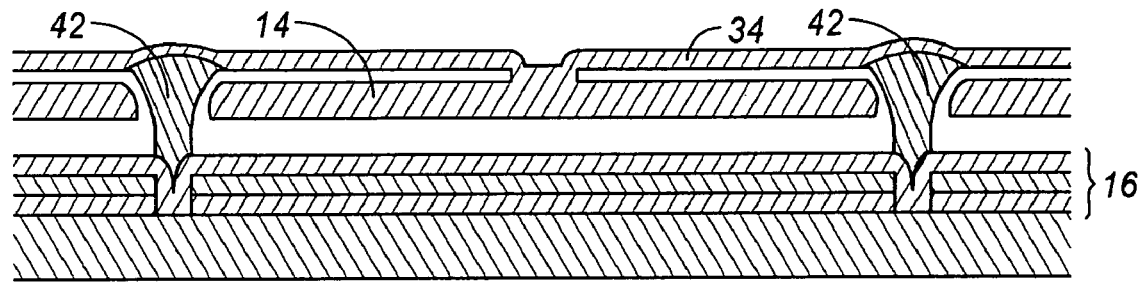
FIG. 7D is a cross section of yet another alternative embodiment of an interferometric modulator.
Figure 7E:
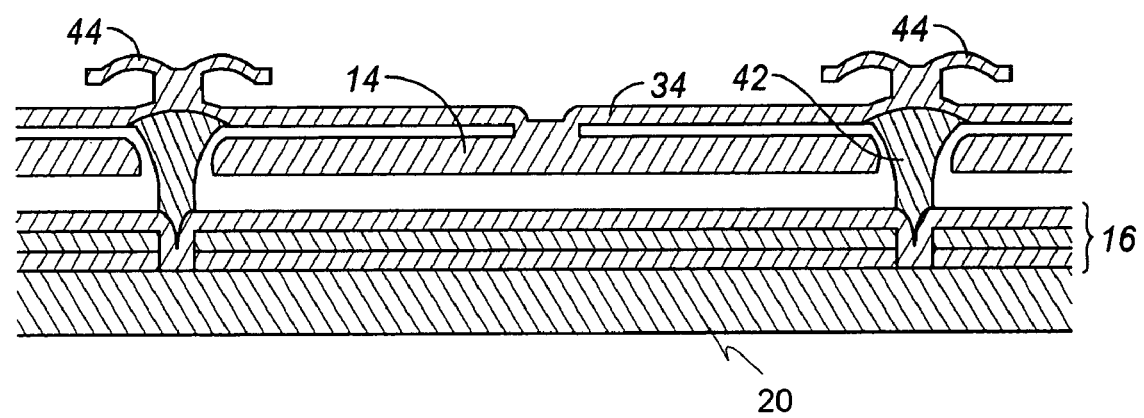
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

As discussed above with reference to FIG. 1, the modulator 12 (i.e., both modulators 12a and 12b) includes an optical cavity formed between the reflective layers 14 (i.e., reflective layers 14a and 14b) and 16 (reflective layers 16a and 16b, respectively). The characteristic distance, or effective optical path length, d, of the optical cavity determines the resonant wavelengths, $\lambda$, of the optical cavity and thus of the interferometric modulator 12. A peak resonant visible wavelength, $\lambda$, of the interferometric modulator 12 generally corresponds to the perceived color of light reflected by the modulator 12. Mathematically, the optical path length d is equal to ½ N$\lambda$, where N is an integer. A given resonant wavelength, $\lambda$, is thus reflected by interferometric modulators 12 having optical path lengths d of ½$\lambda$ (N=1), $\lambda$ (N=2), 3⁄2$\lambda$ (N=3), etc. The integer N may be referred to as the order of interference of the reflected light. As used herein, the order of a modulator 12 also refers to the order N of light reflected by the modulator 12 when the reflective layer 14 is in at least one position. For example, a first order red interferometric modulator 12 may have an optical path length d of about 325 nm, corresponding to a wavelength $\lambda$ of about 650 nm. Accordingly, a second order red interferometric modulator 12 may have an optical path length d of about 650 nm.

In certain embodiments, the optical path length, d, is substantially equal to the distance between the reflective layers that form the optical cavity of the interferometric modulators. Where the space between the reflective layers comprises only a gas (e.g., air) having an index of refraction of approximately 1, the effective optical path length is substantially equal to the distance between the reflective layers. In certain embodiments, a layer of dielectric material in the optical path. Such dielectric materials typically have an index of refraction greater than one. In such embodiments, the optical cavity is formed to have the desired optical path length d by selecting both the distance between the reflective layers and the thickness and index of refraction of the dielectric layer, or of any other layers between the reflective layers. For example, in the embodiment in which the optical cavity includes a layer of a dielectric in addition to the air gap, the optical path length d is equal to $d_1 n_1 + d_2 n_2$, where $d_1$ is the thickness of dielectric layer, $n_1$ is the index of refraction of the dielectric layer and similarly $d_2$ is the thickness of air gap and $n_2$ is the index of refraction of the air gap.

Generally, modulators 12 reflect light that has one or more spectral peaks when wavelength is plotted versus intensity. The perceived color of light produced by a modulator 12 depends on the number, spectral location, and spectral width of these peaks of the modulator 12 within the visible spectrum. The spectral width of such peaks may be characterized by a range of wavelengths at which the peak exceeds a particular threshold intensity, such as the half maximum of intensity of reflected light, e.g., the full width at half maximum. Generally, higher order modulators 12 reflect light over a narrower range of wavelengths, e.g., have a narrower peak or higher "Q" value, and thus produce colored light that is more saturated. The saturation of the modulators 12 that comprise a color pixel affects properties of a display such as the color gamut and white point of the display. For example, in order for a display using a second order modulator 12 to have the same white point or color balance as a display that includes a first order modulator reflecting the same general color of light, the second order modulator 12 may be selected to have a different central peak optical wavelength.

In designing a display using interferometric modulators 12, the modulators 12 may be formed so as to increase the color saturation of reflected light. Saturation is a measure of the narrowness of the distribution of output wavelengths of color light. A highly saturated hue has a vivid, intense color, while a less saturated hue appears more muted and pastel. For example, a laser, which produces a very narrow range of wavelengths, produces highly saturated light. Conversely, a typical incandescent light bulb produces white light that may have a desaturated red or blue color. In one embodiment, the modulator 12 is formed with a distance d corresponding to higher order of interference, e.g., 2nd or 3rd order, to increase the saturation of reflected color light.

An exemplary color display includes red, green, and blue display elements. Other colors are produced in such a display by varying the relative intensity of light produced by the red, green, and blue elements. Such mixtures of primary colors such as red, green, and blue are perceived by the human eye as other colors. The relative values of red, green, and blue in such a color system may be referred to as tristimulus values in reference to the stimulation of red, green, and blue light sensitive portions of the human eye. The range of colors that can be produced by a particular display may be referred to as the color gamut of the display. In general, increasing the saturation of the primary colors increases the color gamut, or range of colors that can be produced by the display. While an exemplary color system based on red, green, and blue are disclosed herein, in other embodiments, the display may include modulators 12 having sets of colors that define other color systems in terms of sets of primary colors other than red, green, and blue.

In certain embodiments, a trade off exists between producing light that appears bright and producing saturated colors (thereby increasing the color gamut of the display) Generally, given the same relative intensity levels, an output spectral peak of a light modulator that is broad or wide will appear brighter than one that is narrow. However, while the broader spectrum will appear brighter, it will also appear pastel in color, i.e., less saturated.

In one embodiment, the saturation of light output by a display that includes the interferometric modulator 12 is increased using a color filter. In particular, such a display may include a color filter that is configured to output light having a wavelength response peak that is narrower than the visible light wavelength response peak of the modulator 12.

Figure 8:
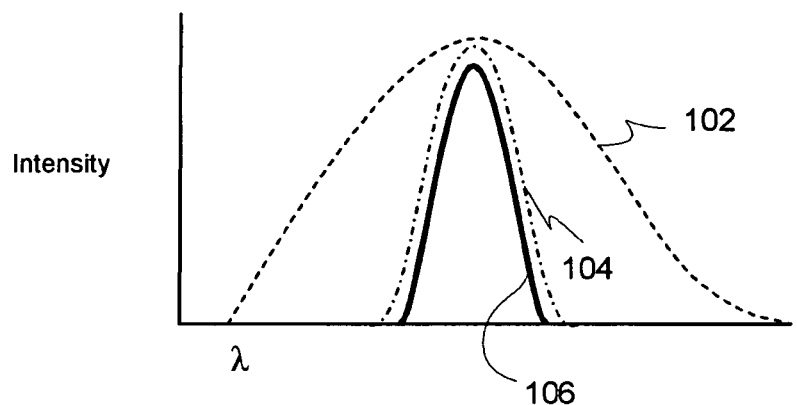
FIG. 8 is a graphical diagram that illustrates the spectral response of an exemplary display that includes the interferometric modulator viewed through a wavelength filter.

FIG. 8 is a graphical diagram that illustrates the spectral response of an exemplary display that includes the interferometric modulator 12 viewed through a wavelength filter. The vertical axis represents the total fraction of optical intensity of light incident on the interferometric modulator that is reflected by the interferometric modulator or transmitted by the wavelength filter when illuminated by white light. In one embodiment, the modulator 12 is configured to reflect light that is perceived as a particular color when illuminated by white light. A trace 102 illustrates the spectral response of the interferometric modulator 12 when viewed without the wavelength filter. A trace 104 illustrates the spectral response of the wavelength filter in isolation. A trace 106 illustrates the spectral response of reflected light of an embodiment of a display that includes the wavelength filter and the interferometric modulator 12. The trace 102 includes a single peak in the visible spectrum. The trace 104 includes a single peak in the visible spectrum that is narrower in width, and substantially centered within the peak defined by the trace 102. When viewed through the wavelength filter, the peak spectral response of the interferometric modulator 12 is substantially narrowed. In particular, as illustrated by the trace 106, the peak response of the combined optical system of the wavelength filter and the interferometric modulator is reduced to be similar in width to the width of the peak of the wavelength filter, which is smaller than the width of the peak spectral response of the modulator 12 in isolation. The narrower peaked response of the display provides more saturated colors and thereby an improved color gamut. The color gamut of the display may thus be adjusted without modifying the spectral response of the interferometric modulators 12.

Figure 9:
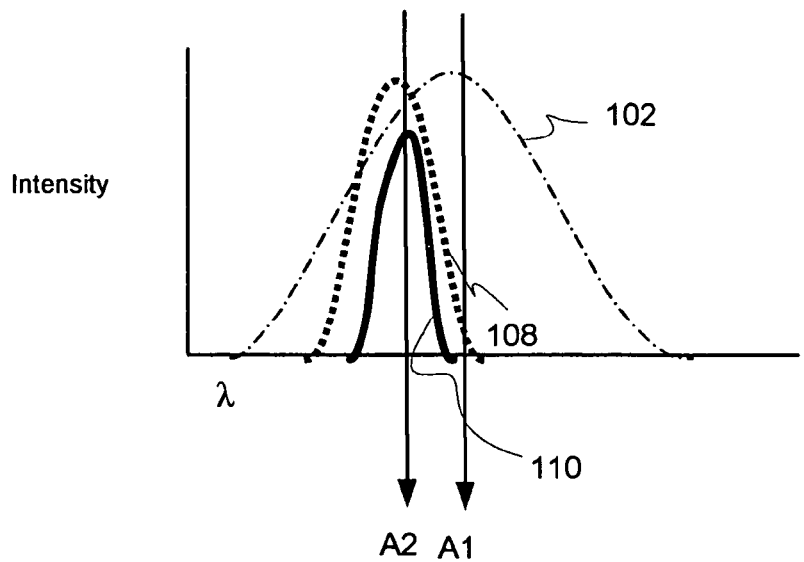
FIG. 9 is a graphical diagram that illustrates the spectral response of another exemplary display that includes the interferometric modulator 12 viewed through a wavelength filter.

FIG. 9 is a graphical diagram that illustrates the spectral response of another exemplary display that includes the interferometric modulator 12 viewed through a wavelength filter. The vertical axis represents the total fraction of optical intensity of light incident on the interferometric modulator that is reflected by the interferometric modulator or transmitted by the wavelength filter. A trace 102 illustrates the spectral response of the interferometric modulator 12 when viewed without the wavelength filter. A trace 108 illustrates the spectral response of the wavelength filter in isolation. A trace 108 illustrates the spectral response of reflected light of an embodiment of a display that includes the wavelength filter and the interferometric modulator 12. The trace 102 includes a single peak in the visible spectrum. The trace 108 includes a single peak in the visible spectrum that is narrower in width than the trace 102. The area under the trace 108 partially overlaps the area defined under the trace 102, rather than fully overlapping the area under the trace 102 as in FIG. 8. When viewed through the wavelength filter, the peak spectral response of the interferometric modulator 12 is even more narrowed than the peak system response illustrated by the trace 106 of FIG. 8. In particular, as illustrated by the trace 110, the peak response of the combined optical system of the wavelength filter and the interferometric modulator is narrower than even the peak of the wavelength filter. Using the wavelength filter with the non-overlapping areas under the spectral peaks thus provides even more saturated colors than using a filter with the spectral properties illustrated in FIG. 8. Moreover, the spectral response of the combined optical system formed by the wavelength filter and the interferometric modulator 12 has a central peak spectral response that is shifted from the separate peak responses of the filter and interferometric modulator 12. For example, in FIG. 9, line A1 indicates the approximate center of the peak response of the interferometric modulator 12. Line A2 indicates the shifted center of the peak response of the combined output of the modulator 12 and the filter. Such a filter may thus be employed to adjust both the saturation and the hue of the display by both narrowing and shifting the spectral profile of the spectral response of the system illustrated by the trace 110 relative to the spectral response of the modulator 12 as illustrated by the trace 102.

Figure 10:
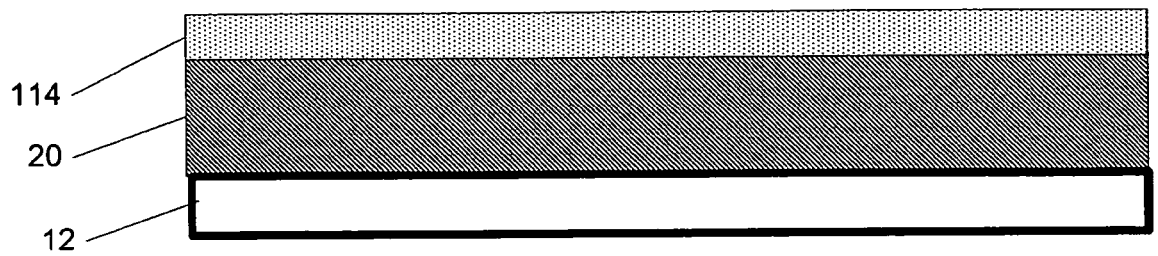
FIG. 10 a side cross-sectional view of an exemplary display that includes an interferometric modulator and a wavelength filter.

FIG. 10 a side cross-sectional view of an exemplary display that includes the interferometric modulator 12 and a wavelength filter 114. In the illustrated embodiment, the wavelength filter 114 is positioned with the substrate 20 between the filter 114 and the modulator 12. However, in other embodiments, the filter 114 may be positioned between the substrate 20 and the modulator 12.

In one embodiment, the filter 114 includes one or more layers of light absorptive material that selectively transmit light having a spectral peak in the visible spectrum, such as illustrated by the traces 104 and 108 of FIGS. 8 and 9, respectively. In one embodiment, the materials may have two or more transmissive spectral peaks. For example, in one embodiment, a filter for a color display may have transmissive peaks in the red, green, and blue portions of the visible spectrum.

In one embodiment, the filter 114 comprises one or more layers of material that are deposited on a substrate, e.g., between one or more layers of the interferometric modulator 12 and the substrate 20. In another embodiment, the filter 114 may comprise a film that is deposited or applied to the substrate 20. In one such embodiment, the filter applied so that the substrate 20 is between the 114 and the modulator 12.

Another embodiment, the filter 114 includes an optical stack that defines one or more interference filters. In one embodiment, an interference filter includes two partially reflective layers separated by one or more layers of dielectric material. In another embodiment, the filter 114 includes a combination of interference and absorptive filters.

In embodiments illustrated with reference to FIGS. 8, 9, and 10, the modulator 12 is effectively illuminated by a light source that is filtered by the wavelength filter 114. In other embodiments, such a filtering effect is obtained by illuminating the interferometric modulator 12 with a narrow band light source.

Figure 11:
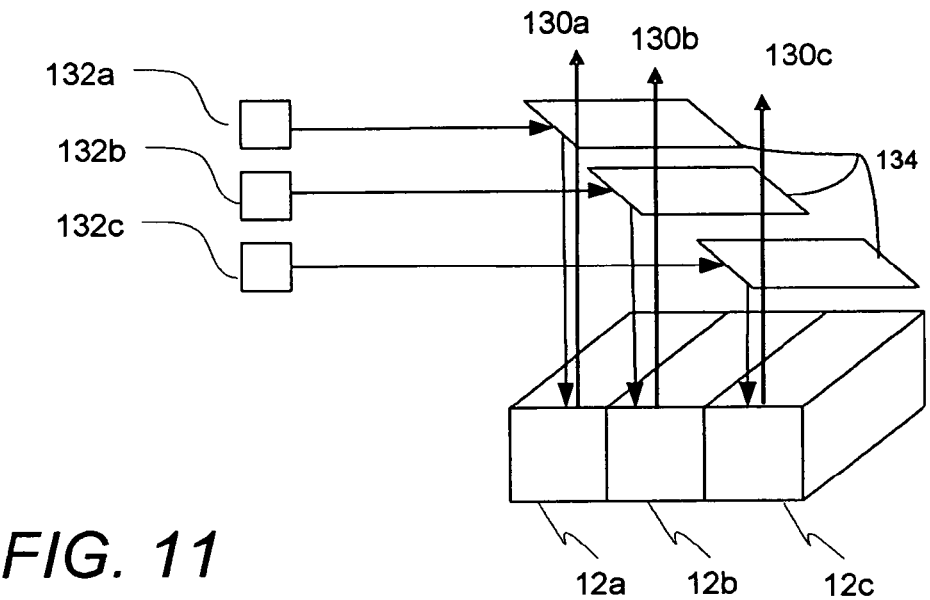
FIG. 11 is a partial schematic diagram that illustrates an exemplary color display that includes one or more narrow band illumination sources.
Figure 13:
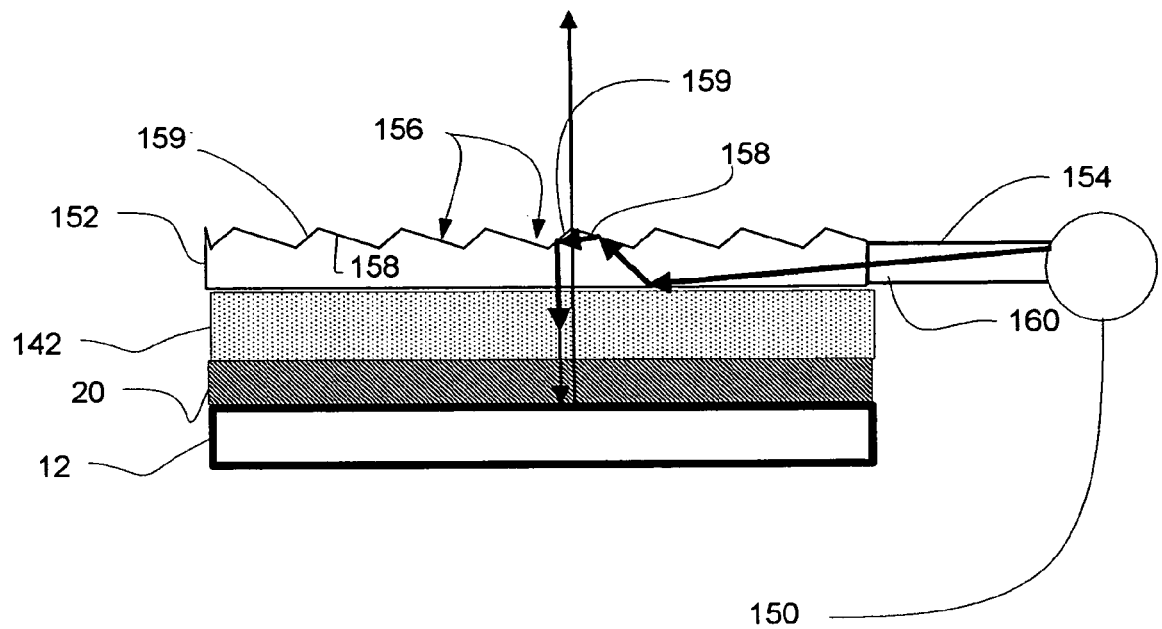
FIG. 13 is a side cross-sectional view of an exemplary display that includes the interferometric modulator and a light source.

FIG. 11 is a partial schematic diagram that illustrates an exemplary color display that includes one or more narrow band illumination sources 132a, 132b, 132c. In particular, in one embodiment, red, green, and blue light sources 132a, 132b, and 132c, respectively, are positioned to illuminate red, green, and blue light modulators 12a, 12b, and 12c. In one embodiment, one or more mirrors or prisms such as mirrors 134 are configured to direct the light from the light sources 132 to the modulators 12. In another embodiment, a light guide plate 152 such as illustrated in FIG. 13 may be used to direct the light from the light sources 132 to the modulators 12 of FIG. 11. In FIG. 11, each of the modulators 12a, 12b, and 12c and respective light source 132a, 132b, and 132c are configured to have corresponding spectral responses, for example that are similar to the filter spectral responses 104 and 108 as illustrated in FIGS. 8 and 9. In one embodiment, the light sources 132 include light emitting diodes (LED) with suitable spectral responses. For example, suitable LEDs are produced by Nichia Corporation, Mountville, Pa. One such LED is Nichia Corporation, part number NSTM515AS. This particular LED includes a common anode lead and separate cathode leads for red, blue, and green.

In one embodiment, the red modulator 12a may have a response similar to that defined by the trace 102 in FIG. 8 and the red light source 132a may have a response similar to that defined by trace 104. In one embodiment, the green and blue modulators 12b, 12c and the green and blue light sources 132b, 132c may have similar properties. In some embodiments, one or both of the green or blue modulators 12b, 12c and light sources 132b, 132c may have spectral responses similar to those illustrated in FIG. 9. In other embodiments, each of the red, green, and blue modulators 12a, 12b, 12c and red, green, and blue light sources 132a, 132b, 132c may selected to be similar to one of the responses illustrated in FIG. 8 or 9 to define different combined optical responses.

Other configurations are also possible. For example, in some embodiments, other suitable illumination sources may also be used. Additionally, various interferometric modulators may be used and the interferometric modulators may have the spectral properties and optical path lengths, d, adjusted so as to achieve the desired final colored light. The particular spectral overlap can be determined by one of skill in the art in light of the present disclosure and can vary depending on the particular use of the device and other factors.

Figure 12:
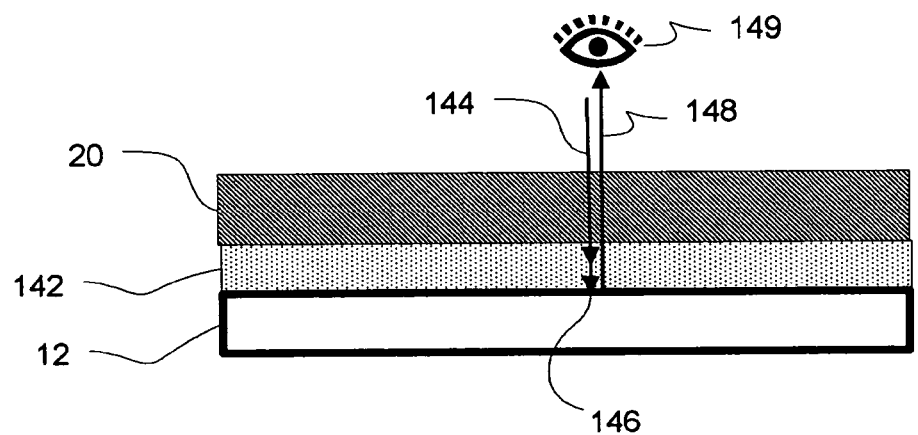
FIG. 12 a side cross-sectional view of another exemplary display that includes the interferometric modulator and a light producing layer that includes photoluminescent material.

FIG. 12 a side cross-sectional view of another exemplary display that includes the interferometric modulator 12 and a light producing layer 142 that includes photoluminescent material. In one embodiment, the color gamut of the display of FIG. 12 is enhanced by receiving light emitted by a photoluminescent material that has a selected spectral response, similar, for example, to one of the responses illustrated by traces 104 or 108 of FIGS. 8 and 9, respectively. In the exemplary display of FIG. 12, light producing layer 142 is between the substrate 20 and the interferometric modulator 12. In other embodiments, the substrate 20 is between the light producing layer 142 and the modulator 12. The photoluminescent light producing layer 142 may be referred to as a photoluminescent screen. The photoluminescent light producing layer 142 may include materials such as phosphorescent or florescent materials.

In operation, one or more photons of light of a first wavelength travel along path 144 until received by the photoluminescent material in the layer 142. The light may be ambient light, such as sunlight, or artificial light. Alternatively, the light may be light provided by a front light associated with the display. The photoluminescent material subsequently emits photons at a second wavelength that may travel in any direction. A portion of these photons travel along a path such as 146 and are reflected to a viewer along path 148 towards a viewing position 149. The photoluminescent material may be selected from a wide variety of substances and can depend, in part, upon the particular benefits sought by the addition of the photoluminescent material. For example, in one embodiment, the photoluminescent material absorbs in the UV spectrum and emits in a narrow band of the visible light spectrum. Such a display thus outputs a greater intensity of visible light by converting light from UV, or other non-visible wavelengths to visible output in a range of wavelengths that is more narrow than the range of wavelengths output by the interferometric modulator 12. In another embodiment, the photoluminescent material absorbs at various wavelengths, but emits over a relatively narrow range of wavelengths. Such embodiments may thus provide relatively high intensity light over a very narrow range of wavelengths to produce bright and saturated colors, as described above with reference to FIGS. 8 and 9. Examples of possible materials include those described in U.S. Pat. No. 6,278,135 to LUMI (long afterglow photoluminescent pigment, from Global Trade Alliance Inc, Scottsdale, Ariz.), and the materials that comprise BC-482A and BC-484, wavelength shifter bars (Saint-Gobaln Crystals and Detectors, Newbury Ohio).

In the exemplary display of FIG. 12, the interferometric modulators 12 are thus illuminated by both available light and light emitted by the layer 142. The overall spectral response of the display is thus the combination of a first response of the modulator 12 to the available light (for example, as illustrated by the trace 102 in FIGS. 8 and 9 when illuminated by white light) and a second response of the modulator 12 to the light emitted by the layer 142. In one embodiment, the light emitted by the layer 142 has a similar spectral response to one of those illustrated by traces 104 and 108 in FIGS. 8 and 9 so that the second response of the modulator 12 is similar to one of the respective traces 106 or 110. In one embodiment, the light emitted by the layer 142 and reflected by the modulator 12 is greater in intensity than the ambient light reflected by the modulator 12 so that color saturation of the modulator 12 is improved.

FIG. 13 is a side cross-sectional view of an exemplary display that includes the interferometric modulator 12 and a light source 150. In the exemplary display, the light source 150 illuminates the modulator 12 via the light guide plate 152. In one embodiment, a light guide 154 is configured to direct light from the light source 150 to the light guide plate 152. The light guide plate 152 may include grooves 156 that are formed by angled surfaces 158 and 159 from which light 160 may be reflected. In one embodiment, the light 160 emitted by light source 150 is maintained within the light guide plate 152 by total internal reflection until the light 160 reflects from the surfaces 158 and 159, from which it is reflected through the substrate 20 and into the modulator 12. In other embodiments, any suitable guiding structure may be used. In some embodiments, the light source 150 is a front light positioned to illuminate the interferometric modulator 12. One suitable light source includes one or more color light emitting diodes (LEDs) that have narrow band spectral outputs. Light reflected by the light guide plate 152 into the modulator 12 passes through the light producing layer 142 so as to produce a spectral response as described with reference to FIG. 12. In some embodiments, the light source is a UV emitter and the light producing layer 142 comprises a photoluminescent material that converts UV light from the UV emitter into a suitable range of visible light.

The position of a light source relative to the modulators 12 may result in a shift in the color output of the display when light from the light source is incident on the display 30 at a non-normal angle to the reflective surfaces 14 and 16 of the modulator 12. The embodiments of FIGS. 11 and 13 also may reduce such illumination angle dependent color shift of the display because a source of the light is at a predetermined and consistent position and distance relative to the reflective layers 14 and 16 of the modulator 12. Thus, if there is any color shift due to the position of the light source 150 relative to the modulators 12, the interferometric modulator 12 can be tuned to reduce or eliminate this color shift.

While the embodiment illustrated in FIG. 13 depicts a separate light guide plate 152 and light producing layer 142, in some embodiments, the light guide plate 152 may include the photoluminescent layer. Moreover, embodiments may also include other layers and features not illustrated in FIG. 13. For example, in one embodiment, the display may also include the filter layer 114 to further adjust the spectral response of the display.

Displays that include photoluminescent layer 142 may thus have increased saturation (and thereby an increased color gamut). In addition, such displays may also have increased output optical intensity by conversion of non-visible to visible wavelengths by the layer 142.

Although full color displays, e.g., displays capable of displaying different shades of red, green, and blue, provide more vibrant and colorful output than monochrome displays, full color displays generally require the device 40 in which the display is included to process more data than monochrome display. In addition, more modulators 12 along with more complex control circuits are also generally included in some embodiments of full color displays than in monochrome displays. This complexity tends to cause color displays to be more expensive to produce than monochrome display of similar size and pixel resolution. However, in certain applications, color output of shades of a single predetermined color may be acceptable. Thus, one embodiment includes a display that comprises two or more sections or regions that each output a different predetermined color.

Figure 14:
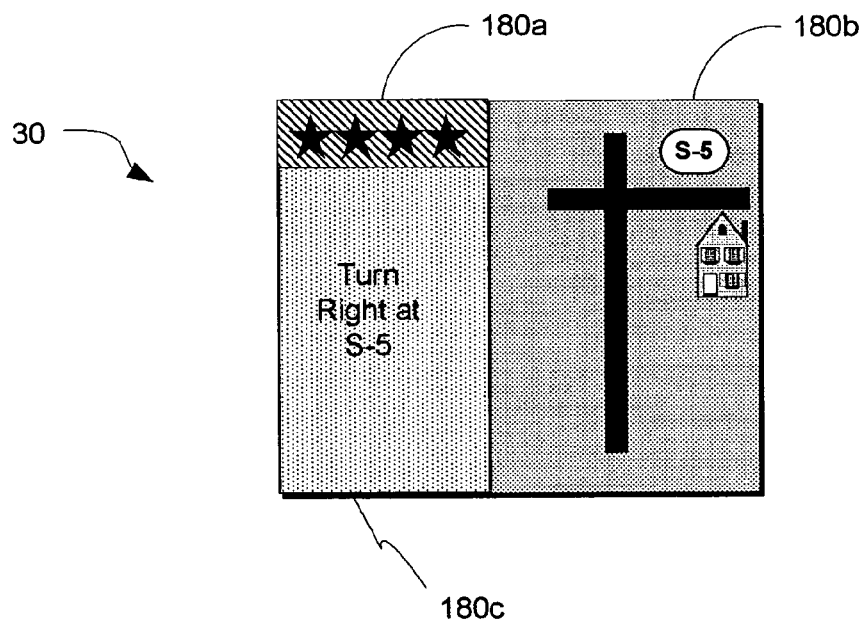
FIG. 14 is a front view of an exemplary display that includes several regions that each display an image in a different color.

FIG. 14 is a front view of an exemplary display 30 that includes several regions 180 that each display an image in a different color. For example, the region 180a displays an indicator image in a first color, e.g., green, the second exemplary region 180b displays a map image in a second color, e.g., blue, and the third exemplary region 180c displays directions in a third color, e.g., red.

In one embodiment, the modulators 12 in a particular region 180 may be configured to output colored light when the movable reflective layer 14 of each is in one position and be non-reflective or black when the movable layer 14 is in another position. For example, such modulators 12 may be configured to output colored light when the movable reflective layer 14 is in the relaxed position and to be non-reflective (to appear black) when in an activated position. In another embodiment, the modulators 12 in a particular region may be configured to output colored light when the movable reflective layer 14 of each is in one position and white (or light perceived as white) when the movable layer 14 is in another position. For example, such modulators 12 may be configured to output colored light when the movable reflective layer 14 is in the relaxed position and to reflect white light in an activated position. Note that the color monochrome regions of the display may in one embodiment produce only the particular color and black (or the particular color and white). In other embodiments, one or more of the color monochrome regions may produce a plurality of shades of the particular color between the color and black (or the between the color and white).

In one embodiment, two or more of the regions 180a, 180b, 180c display the same color. In one embodiment, one or more of the regions is configured to display white (e.g. when activated) or black (e.g. when relaxed), rather than a narrow band color, such as red, green, or blue (e.g. when relaxed) and black (e.g. when activated). In one embodiment, one or more of the regions 180 are configured to display a single predetermined color, e.g., green or shades thereof, while one or more other regions are configured to display full color (e.g., red, blue, and green). For example, in one embodiment, the region 180a displays data in monochrome green (e.g., green and black), the region 180b displays data in monochrome red (e.g., red and white), and the region 180c displays data in full color using red, green, and blue light producing modulators 12. Other arrangements and configurations are also possible.

In one embodiment, each of the pixels of a region comprises a single display element, e.g., an interferometric modulator 12 that outputs light of the same color. In another embodiment, each of the pixels of a region comprises subpixels. These subpixels may output light of the same color. Each of the subpixels may comprise one or more display elements such as interferometric modulators. As used with reference to the embodiments illustrated in FIG. 14, a pixel refers to a portion of a display that outputs light corresponding to a single pixel of an image.

Such a display 30 such as illustrated in FIG. 14 can be especially useful in systems in which multiple streams of information are displayed concurrently but in which the cost of a full color display is to be avoided. By dividing the information by color and placing it in separate sections of the display, the risk of confusion as to the source of data may also be reduced. For example, one embodiment may include a device for displaying blood pressure in one color and heart rate in a second color on a diagnostic display screen. Alternatively, in other embodiments devices may include various regions of colored interferometric modulators in predefined patterns or representations. For example, one region of color interferometric modulators 12 may be used to provide time or phone information for a cell phone, while the other regions of color interferometric modulators 12 may be arranged in the shape of warning indicators such as a "low battery" indicator.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A display comprising separate sections, the display comprising:
   a first plurality of pixels in a first contiguous section of the display configured to display a first image, each of the first plurality of pixels including one or more modulators each having times of driving in relaxed and actuated states, each of the one or more modulators configured to produce a same first color as all other modulators in the first plurality of pixels at a time of driving and structurally not capable of producing a color that is different from the same first color during an other time of driving the first section of the display including only the one or more modulators configured to produce the same first color and not including an modulators configured to produce a color different from the same first color; and
   a second plurality of pixels in a second section of the display configured to display a second image, each of the second plurality of pixels including one or more modulators each having relaxed and actuated states,
   wherein the first plurality of pixels is different from the second plurality of pixels when each of the modulators in the first and second plurality of pixels are in the relaxed state, and wherein the first plurality of pixels is different from the second plurality of pixels when each of the modulators in the first and second plurality of pixels are in the actuated state, such that the first plurality of pixels output light of the same first color that is a different color than output by the second plurality of pixels.

2. The display of claim 1, wherein the first plurality of pixels form a first monochrome region and the second plurality of pixels form a second monochrome region.

3. The display of claim 1, wherein each of the pixels in the first section of the display includes a first plurality of subpixels defining a first pixel structure, wherein each of the first subpixels outputs light of a first color.

4. The display of claim 3, wherein each of the pixels in the second section of the display includes a second plurality of subpixels defining a second pixel structure, wherein each of the second subpixels outputs light of a second color, wherein the first and second colors are different.

5. The display of claim 4, wherein the pixels of the first plurality of pixels form a first monochrome region and wherein the pixels of the second plurality of pixels form a second monochrome region.

6. The display of claim 1, wherein the first section is adjacent to the second section.

7. The display of claim 1, wherein the first and second sections share at least one common border.

8. The display of claim 1, wherein the pixels are configured to reflect light.

9. The display of claim 1, wherein each of the pixels includes at least one interferometric modulator.

10. The display of claim 1, wherein each of the first plurality of pixels includes a first plurality of subpixels defining a first pixel structure, wherein each of the subpixels is configured to output the same first color and wherein each of the second plurality of pixels includes a second plurality of subpixels defining a second pixel structure, wherein each of which is configured to output the same second color.

11. The display of claim 10, wherein each of the subpixels includes at least one light modulator.

12. The display of claim 1, wherein each of the first plurality of pixels includes a single light modulator configured to output a first color and defining a first pixel structure and wherein each of the second plurality of pixels includes a single light modulator configured to output a second color and defining a second pixel structure.

13. A display comprising:
   a first plurality of light modulators located in a first contiguous region of the display, each of the light modulators having times of driving in relaxed and actuated states, each of the light modulators including a reflective surface configured to be positioned at a first distance from a partially reflective surface, wherein the first distance is configured so as to produce a first color,
   wherein the first plurality of light modulators is configured to display a first image, and wherein the first contiguous region is configured to only produce the first color and white, the first color and black, a plurality of shades of the first color between the first color and white, or a plurality of shades of the first color between the first color and black as visible optical output at a time of driving, the first plurality of light modulators not structurally capable of producing a color that is different from the first color and white, the first color and black, the plurality of shades of the first color between the first color and white, or the plurality of shades of the first color between the first color and black as visible optical output during any other time of driving; and
   a second plurality of light modulators located in a second contiguous region of the display, each of the light modulators having relaxed and actuated states, each of the light modulators including a reflective surface configured to be positioned at a second distance from a partially reflective surface, wherein the second distance is configured so as to produce a second color,
   wherein the first plurality of light modulators is different from the second plurality of light modulators when each of the modulators in the first and second plurality of light modulators are in the relaxed state, and wherein the first plurality of light modulators is different from the second plurality of light modulators when each of the modulators in the first and second plurality of light modulators are in the actuated state, state such that the first plurality of light modulators output light of a different color than output by the second plurality of light modulators,
   wherein the second plurality of light modulators is configured to display a second image, and wherein the second contiguous region is configured to only produce the second color and white, the second color and black, a plurality of shades of the second color between the second color and white, or of the second color between the second color and black as visible optical output, wherein the first and second contiguous regions of the display are non-overlapping regions.

14. The display of claim 13, further comprising a third plurality of light modulators located in a third region of the display, wherein the third plurality of light modulators is configured to display a third image in at least two colors.

15. The display of claim 13, wherein at least the first plurality of modulators is configured to display text.

16. The display of claim 13, wherein each of the first and second plurality of light modulators includes at least one interferometric modulator.

17. The display of claim 13, further comprising:
a processor that is in electrical communication with at least one of the first and second plurality of light modulators, the processor being configured to process image data; and
a memory device in electrical communication with the processor.

18. The display of claim 17, further comprising:
a driver circuit configured to send at least one signal to at least one of the first and second plurality of light modulators.

19. The display of claim 18, further comprising:
a controller configured to send at least a portion of the image data to the driver circuit.

20. The display of claim 17, further comprising:
an image source module configured to send the image data to the processor.

21. The display of claim 20, wherein the image source module includes at least one of a receiver, transceiver, and transmitter.

22. The display of claim 17, further comprising:
an input device configured to receive input data and to communicate the input data to the processor.

23. A display comprising:
a first means for displaying a pixel of a first image in a first section of the display wherein the first means is configured to only produce a first color and white, the first color and black, a plurality of shades of the first color between the first color and white, or a plurality of shades of the first color between the first color and black as visible optical output at a time of driving, the first means structurally not capable of producing a color that is different from the first color and white, the first color and black, the plurality of shades of the first color between the first color and white, or the plurality of shades of the first color between the first color and black as visible optical output during any other time of driving, the first means having relaxed and actuated states during the times of driving; and
a second means for displaying a pixel of a second image in a second section of the display wherein the second means is configured to only produce a second color and white, the second color and black, a plurality of shades of the second color between the second color and white, or of the second color between the second color and black as visible optical output, the second means having relaxed and actuated states,
wherein the structure of the first means is different from the structure of the second means when both the first and second means are in the actuated state, and wherein the structure of the first means is different from the structure of the second means when both the first and second means are in the relaxed state such that the first means output light of a different color than output by the second means.

24. The display of claim 23, wherein the first means for displaying a pixel of the first image includes a pixel in the display.

25. The display of claim 24, wherein the display pixel includes a plurality of interferometric modulators.

26. The display of claim 24, wherein the display pixel includes a single interferometric modulator.

27. The display of claim 23, wherein the second means for displaying a pixel of the second image includes a pixel in the display.

28. The display of claim 27, wherein the display pixel includes a plurality of interferometric modulators.

29. The display of claim 27, wherein the display pixel includes a single interferometric modulator.

30. The display of claim 23, wherein the first and second sections are monochrome.

31. The display of claim 23, wherein the first and second sections are non-overlapping.

32. A method of making a display comprising separate sections, the method comprising:
forming a first plurality of pixels in a first section of the display, each of the first plurality of pixels including at least one light modulator having times of driving relaxed and actuated states the at least one light modulator configured to produce a same first color as all other modulators in the first plurality of pixels at a time of driving and structurally not capable of producing a color that is different from the same first color during an other time of driving the first section of the display including only the at least one modulator configured to produce the same first color and not including any modulators configured to produce a color different from the same first color; and
forming a second plurality of pixels in a second section of the display, the second plurality of pixels including at least one light modulator having relaxed and actuated states,
wherein the second plurality of pixels is formed differently than the first plurality of pixels such that the first plurality of pixels output light of a different color than output by the second plurality of pixels when each of the modulators in the first and second plurality of pixels are in the relaxed states.

33. The method of claim 32, further comprising forming a third plurality of pixels in a third section of the display such that the third plurality of pixels has a third pixel structure that is different from first and second pixel structures of the first and second plurality of pixels and the first and second plurality of pixels each output light of a different color than the third plurality of pixels.

34. The method of claim 32, wherein forming each of the first plurality of pixels includes forming a movable reflective layer and a partially reflective layer separated by a first distance and each of the second plurality of pixels includes a movable reflective layer and a partially reflective layer separated by a second distance.

35. The method of claim 34, wherein the first pixel structure is different from second pixel structure at least in that the first distance is different from the second distance.

36. The method of claim 32, wherein the at least one light modulator includes a single interferometric modulator.

37. The method of claim 32, wherein the at least one light modulator includes a plurality of interferometric modulators.

38. The method of claim 37, wherein each of the interferometric modulators in the first plurality of light modulators output light of substantially the same color as other interferometric modulators in the first plurality of light modulators and wherein each of the interferometric modulators in the second plurality of light modulators output light of substantially the same color as other interferometric modulators in the second plurality of light modulators.

39. The method of claim 32, wherein forming the first plurality of pixels further comprises including at least one color filter.

40. The method of claim 39, wherein forming the second plurality of pixels further comprises including at least one color filter.

41. The method of claim 40, wherein the at least one color filter for the first plurality of pixels is different from the at least one color filter for the second plurality of pixels.

42. A display formed by the method of claim 32.

43. The display of claim 1, wherein each of the first plurality of pixels includes a movable reflective surface and a partially reflective surface separated by a first distance and each of the second plurality of pixels includes a movable reflective surface and a partially reflective surface separated by a second distance.

44. The display of claim 43, wherein the first plurality of pixels is different from the second plurality of pixels in that the first distance is different from the second distance.

45. The display of claim 13, wherein the distance configured so as to produce a first color is different from the distance configured so as to produce a second different color.

46. The display of claim 23, wherein the first means includes a movable reflective surface and a partially reflective surface separated by a first distance and the second means includes a movable reflective surface and a partially reflective surface separated by a second distance.

47. The display of claim 46, wherein the first distance is different from the second distance.

48. A display comprising:
a first plurality of light modulators located in a first contiguous region of the display, each of the light modulators having times of driving in relaxed and actuated states, each of the light modulators including a reflective surface configured to be positioned at a distance from a partially reflective surface, wherein the distance is configured so as to produce a first color, wherein the first plurality of light modulators is configured to display a first image, and wherein the first contiguous region is configured to only produce the first color and white, the first color and black, white and a plurality of shades of the first color between the first color and white, or black and a plurality of shades of the first color between the first color and black as visible optical output at a time of driving, the first plurality of light modulators structurally not capable of producing a color that is different from the first color and white, the first color and black, white and the plurality of shades of the first color between the first color and white, or black and the plurality of shades of the first color between the first color and black as visible optical output during any other time of driving, and
a second plurality of light modulators located in a second contiguous region of the display, each of the light modulators having relaxed and actuated states, wherein the second plurality of light modulators is configured to display a second image in at least two colors,
wherein the first plurality of light modulators is different from the second plurality of light modulators when each of the modulators in the first and second plurality of light modulators are in the relaxed state, and wherein the first plurality of light modulators is different from the second plurality of light modulators when each of the modulators in the first and second plurality of light modulators are in the actuated state, state such that the first plurality of light modulators output light of a different color than the second plurality of light modulators; and
wherein the first and second contiguous regions of the display are non-overlapping regions.

49. The display of claim 48, wherein at least the first plurality of modulators is configured to display text.

50. The display of claim 48, wherein each of the first and second plurality of light modulators includes at least one interferometric modulator.

* * * * *

UNITED STATES PATENT AND TRADEMARK OFFICE
CERTIFICATE OF CORRECTION

| | |
|---|---|
| PATENT NO. | : 8,102,407 B2 |
| APPLICATION NO. | : 11/208167 |
| DATED | : January 24, 2012 |
| INVENTOR(S) | : Brian J. Gally and William J. Cummings |

It is certified that error appears in the above-identified patent and that said Letters Patent is hereby corrected as shown below:

On Title Page 3, Item (56), Line 2, Under Other Publications, change "cie.htnnl" to --cie.html--.

On Title Page 3, Item (56), Line 12, Under Other Publications, change "interfermotric" to --interferometric--.

In Column 1, Line 21, change "and or" to --and/or--.

In Column 3, Line 11, after "10", insert --is--.

In Column 3, Line 17, after "12", insert --is--.

In Column 3, Line 64, change "provided by provided by" to --provided by--.

In Column 6, Line 29, after "respectively", insert --.--.

In Column 7, Line 56, change "ore" to --or--.

In Column 11, Line 42, after "display)", insert --.--.

In Column 12, Line 61, after "10", insert --is--.

In Column 13, Line 16, after "between the", insert --filter--.

In Column 14, Line 53, change "Gobaln" to --Gobain--.

In Column 17, Line 33, In Claim 1, change "an" to --any--.

In Column 17, Line 33, In Claim 1, after "driving", insert --,--.

In Column 17, Line 36, In Claim 1, change "an" to --any--.

In Column 18, Line 60, In Claim 13, before "such", delete "state".

In Column 20, Line 26, In Claim 32, after "driving", insert --in--.

In Column 20, Line 27, In Claim 32, after "states", insert --,--.

In Column 20, Line 31, In Claim 32, change "an" to --any--.

In Column 20, Line 32, In Claim 32, after "driving", insert --,--.

In Column 20, Line 60, In Claim 35, change "from" to --from the--.

In Column 22, Line 30, In Claim 48, before "such", delete "state".

Signed and Sealed this
Twenty-eighth Day of August, 2012

David J. Kappos
*Director of the United States Patent and Trademark Office*